United States Patent [19]

Smith, III et al.

[11] Patent Number: 4,858,648

[45] Date of Patent: Aug. 22, 1989

[54] SELF-FLUSHING HYDRAULIC COUPLING

[76] Inventors: Robert E. Smith, III; Virgil E. Mosley, Both of P.O. Drawer FF, Stafford, Tex. 77477

[21] Appl. No.: 90,678

[22] Filed: Aug. 28, 1987

[51] Int. Cl.[4] ............................................. F16L 37/28
[52] U.S. Cl. .............................. 137/614.04; 137/614; 285/14
[58] Field of Search ................... 137/614.04, 860, 614, 137/614.03; 285/13, 14, 924

[56] References Cited

U.S. PATENT DOCUMENTS

| | | | |
|---|---|---|---|
| 1,913,982 | 6/1933 | Fox | 285/111 |
| 1,928,821 | 10/1933 | Santiago | 285/22 |
| 2,218,318 | 10/1940 | Pfauser | 284/19 |
| 2,265,267 | 12/1941 | Cowles | 284/19 |
| 2,727,761 | 12/1955 | Elliott et al. | 285/14 X |
| 2,735,696 | 2/1956 | Omon et al. | 137/614.05 |
| 2,825,590 | 4/1958 | Sutherland | 286/26 |
| 2,931,668 | 4/1960 | Baley | 137/614.04 |
| 3,046,026 | 7/1962 | Burrows | 277/171 |
| 3,089,713 | 5/1963 | Scaramucci | 285/14 |
| 3,111,179 | 11/1963 | Albers et al. | 175/393 |
| 3,215,161 | 11/1965 | Goodwin et al. | 137/614.04 |
| 3,236,251 | 2/1966 | Hansen | 137/614.05 |
| 3,291,152 | 12/1966 | Comer | 137/614.04 |
| 3,348,575 | 10/1967 | Simak | 137/614.05 |
| 3,507,523 | 4/1970 | Cadley | 285/307 |
| 3,516,524 | 6/1970 | Kelty et al. | 192/3.3 |
| 3,550,624 | 12/1970 | Johnson | 137/614 |
| 3,618,690 | 11/1971 | Johnson | 137/514.7 |
| 3,707,878 | 1/1973 | Treichler | 92/164 |
| 3,730,221 | 5/1973 | Vik | 137/614.04 X |
| 3,777,771 | 12/1973 | De Visscher | 137/614.04 X |
| 3,797,510 | 3/1974 | Torres et al. | 137/68 |
| 3,917,220 | 11/1975 | Gilmore | 251/86 |
| 4,124,228 | 11/1978 | Morrison | 285/1 |
| 4,214,607 | 7/1980 | Boutielle | 137/860 X |
| 4,222,411 | 9/1980 | Herzan et al. | 137/614.04 |
| 4,302,033 | 11/1981 | Evans et al. | 285/14 |
| 4,348,039 | 9/1982 | Miller | 285/1 |
| 4,452,462 | 6/1984 | Karr, Jr. | 277/105 |
| 4,582,295 | 4/1986 | Kugler et al. | 251/149.6 |
| 4,637,470 | 1/1987 | Weathers et al. | 166/344 |
| 4,641,841 | 2/1987 | Reagan | 277/30 |
| 4,656,393 | 4/1987 | Amboss | 315/5.38 |
| 4,709,726 | 12/1987 | Fitzgibbons | 137/614.04 |
| 4,709,727 | 12/1987 | Gober | 137/625.66 |

FOREIGN PATENT DOCUMENTS

| | | | |
|---|---|---|---|
| 0024986 | 3/1981 | European Pat. Off. | |
| 0177650 | 4/1986 | European Pat. Off. | |
| 663132 | 10/1928 | France | 137/614.04 |
| 1142462 | 12/1955 | France | 137/614.04 |
| 76801 | 11/1958 | France | 137/614.04 |
| 1491524 | 6/1966 | France | 137/614.04 |
| 343726 | 7/1956 | Switzerland | |
| 552435 | 4/1943 | United Kingdom | 284/19 |
| 552682 | 4/1943 | United Kingdom | |
| 677685 | 8/1952 | United Kingdom | |
| 819421 | 9/1959 | United Kingdom | |
| 886133 | 1/1962 | United Kingdom | |
| 888143 | 1/1962 | United Kingdom | |
| 925491 | 5/1963 | United Kingdom | |
| 1548852 | 7/1979 | United Kingdom | |
| 1564906 | 4/1980 | United Kingdom | |
| 1603670 | 11/1981 | United Kingdom | |

*Primary Examiner*—A. Michael Chambers
*Assistant Examiner*—John C. Fox

[57] ABSTRACT

A self-flushing subsea hydraulic coupling having a pair of interconnectable male and female and members and a flushing port for flushing the hydraulic line connected to one of the members. Each of the members includes a poppet valve, the poppet valve of the member not designated for flushing being sealed during the flushing operation. During the flushing operation, the male member is partially withdrawn from the female member receiving chamber so that its leading face passes the flushing port. Flushing fluid passes through the hydraulic line connected to the member, through the poppet valve, into the receiving chamber and out through the flushing port. An o-ring seals the receiving chamber and prevents sea water from entering the receiving chamber when the male member is partially withdrawn from the female member.

11 Claims, 2 Drawing Sheets

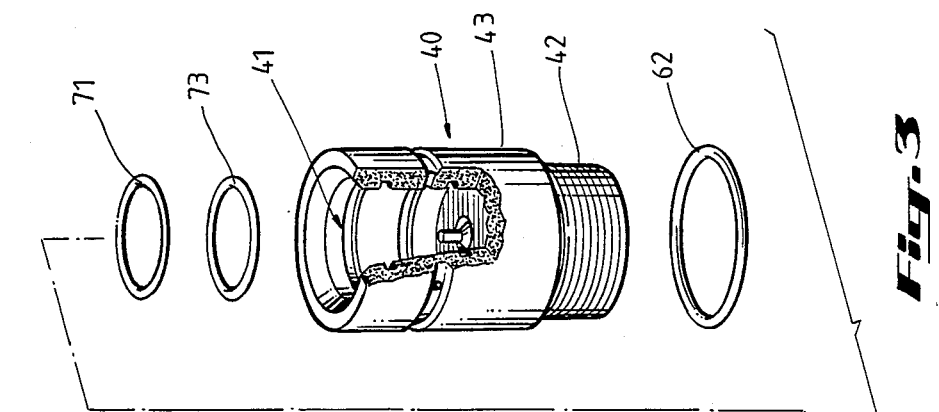
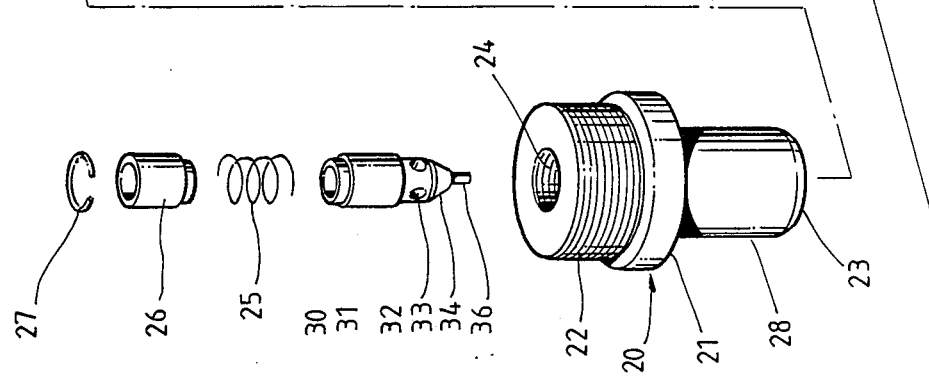
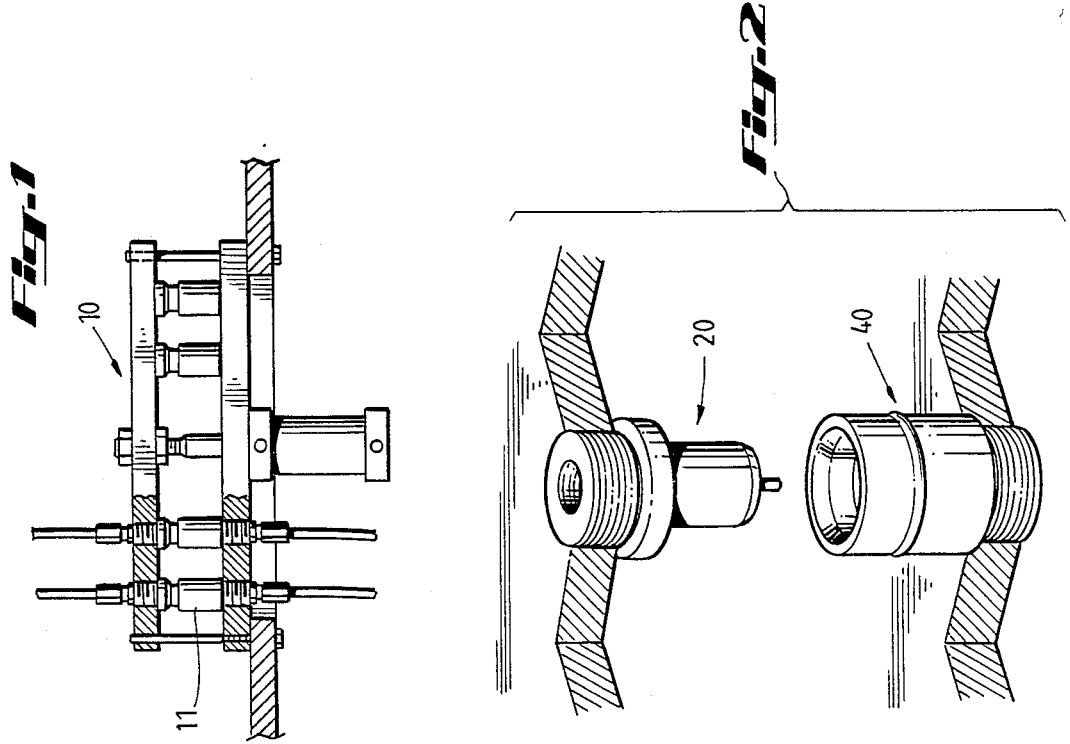

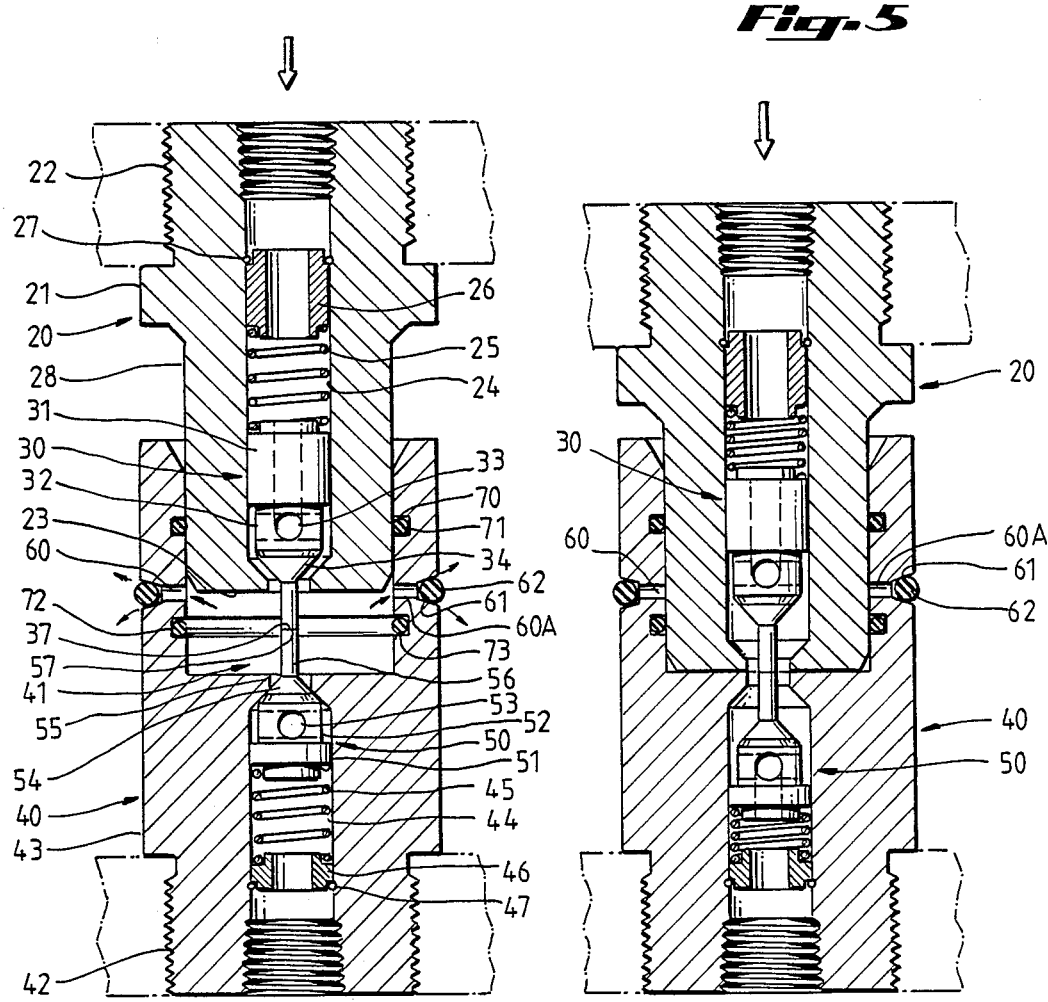

SELF-FLUSHING HYDRAULIC COUPLING

BACKGROUND OF THE INVENTION

1. Field of the Invention

This invention relates in general, to hydraulic couplings, and specifically to hydraulic couplings used in undersea drilling and production applications. More particularly, the invention involves a self-flushing hydraulic coupling for flushing bacteria and other contaminants from the hydraulic lines and other subsea equipment while both members of the coupling remain subsea.

2. Description of the Related Art

Subsea hydraulic couplings are old in the art. The couplings generally consist of a male and female member with sealed fluid passageways connecting therebetween. The female member generally is a cylindrical body with a relative large diameter longitudinal bore at one end and a relatively small diameter longitudinal bore at the other. The small bore facilitates connections to hydraulic lines, while the large bore seals and slidingly engages the male member of the coupling. The male member includes a cylindrical portion at one end having an outer diameter approximately equal to the diameter of the large bore in the female member of the coupling. The male member also includes a connection at its other end to facilitate connection to hydraulic lines. When the cylindrical portion of the male member is inserted into the large bore of the female member, according to various embodiments of the device, fluid flow is established between the male and female members.

The male member and female member are generally connected to opposing plates of a manifold and are held together by bolts or hydraulic members attached to the plates of the manifolds. The male member is commonly attached to one plate, while the female member is attached to an opposing plate so as to face the male member and align with it. The male member and female member may be attached to the manifold plates using various means, such as set screws or threads. Techniques for attaching the members to such manifold plates are well known to those skilled in the art.

A problem with most subsea hydraulic systems used in drilling and production operations utilizing water and soluble oil as hydraulic fluid, is the stagnation and growth of bacteria, as well as the accumulation of other contaminants, in the hydraulic lines and other subsea equipment. Periodically, the hydraulic lines must be flushed out to prevent the lines from stopping up. Typically, the flushing operation involves special flushing equipment that is sent subsea and utilized manually with divers, or, alternatively with a special diverless system. Both the automatic and manual system are very costly in terms of additional equipment needed and time lost during the flushing operation. Typically, it is desirable to flush out the hydraulic line connected to one member of the hydraulic coupling while that member is disconnected from the other member of the coupling. The biodegradable flushing fluid may be expelled from the disconnected coupling member into the sea water surrounding the coupling.

SUMMARY OF INVENTION

The present invention resides in a hydraulic undersea coupling of the foregoing type, including male and female members for fluid communication therebetween such that the hydraulic lines and equipment connected to one of the coupling members may be flushed out while the male member is partially withdrawn from the female member receiving chamber. During the flushing operation, the male member remains in sealed relation with the female member as the coupling is subsea. One or more flushing ports are included in the female member, communicating between the receiving chamber and the outside surface of the female member body. Each flushing port includes a one way check valve, such as an o-ring, to prevent entrapping sea water in the receiving chamber while the male ember is partially withdrawn from the female member.

The male and female member each include a poppet valve to control fluid flow therethrough. During the flushing operation, the poppet valve of the member designated for flushing remains open while the poppet valve of the member not designated for flushing is closed. When the male member is partially withdrawn from the female member receiving chamber, the poppet valve spring in the member not designated for flushing exerts a stronger force to close the poppet valve of that member. A weaker poppet valve spring on the member designated for flushing allows that poppet valve to remain open during the flushing operation. Both poppet valve noses remain in contact while only the poppet valve of the member designated for flushing is open.

According to the present invention, to commence the flushing operation the leading face of the male member must pass the flushing port. The flushing fluid, which is under pressure, flows through the hydraulic line connected to the member designated for flushing, through the coupling member and into the receiving chamber, and out the flushing port past the o-ring check valve.

The flushing ports enable the flushing operation to take place with only partial separation of the coupling members, and the members remain in sealed relation. The present invention solves the problems of additional equipment and time normally required for the flushing operation of a subsea hydraulic coupling.

BRIEF DESCRIPTION OF DRAWINGS

FIG. 1 is an elevational view of the manifold incorporating couplings such as that of the present invention.

FIG. 2 is a perspective view of a coupling of the present invention showing how the coupling might be connected to the manifold of FIG. 1.

FIG. 3 is an exploded perspective view of the present invention with the body partially cut away.

FIG. 4 is a section view of the male and female coupling members according to a preferred embodiment of the present invention, with the flushing ports open.

FIG. 5 is a section view of the male and female coupling members according to a preferred embodiment of the present invention, with the flushing ports closed.

DETAILED DESCRIPTION OF THE PREFERRED EMBODIMENT

The preferred embodiment of the present invention comprises a male member 20, a female member 40 and fluid passages establishing fluid communication between the male member and female member when the male member is inserted into the female member receiving chamber 41. The fluid communication between the members is established when the tips 37 and 57 of the poppet valves 30 and 50 are mutually engaged during the connection of the body members. The axial movement required to connect the body members unseats the poppet valves and opens the bores of the body members to establish communication therebetween. Each poppet valve in a self-sealing coupling usually relies upon in part the fluid forces within the body member bore to maintain the poppet valve in engagement with the valve seat.

FIG. 1 is an elevational view of a manifold 10 which is commonly used with undersea hydraulic couplings. The couplings 11 are generally connected to opposing plates of the manifold and are held together by bolts or hydraulic members attached to the plates. As shown in FIG. 2, the male member 20 is commonly attached to one plate while the female member 40 is attached to the second plate so as to face the male member 20 and align with it.

FIG. 3 is an exploded perspective view of the coupling of the present invention. As shown, the main components of the coupling include a female member 40 and a male member 20. The female member 40 and the male member 20 each comprise subcomponents which will be more fully described below.

As shown in FIG. 3, according to the present invention the male member 20 comprises a body having a handle 22, a shoulder 21 and a cylindrical outer wall 28. A longitudinal bore 24 extends from the handle end of the male member to the leading face 23 of the male member. A poppet valve 30 is slideably received within the longitudinal bore 24.

The poppet valve 30 of the male member comprises a first hollow cylindrical body section 31 with outer dimensions corresponding to the longitudinal bore 24. Adjacent the first body section of the poppet valve is a second hollow body section 32 having apertures 33 for fluid flow therethrough when the poppet valve is in the open position. Adjacent the second body section is a conical valve face 34 which mates with valve seat 35 near the leading face 23 of the male member to seal off fluid flow through the male member. At the apex of the conical valve face 34 is a nose section 36 extending longitudinally to tip 37. Normally the male member poppet valve 30 is urged towards the closed position by poppet valve spring 25. The other end of the poppet valve spring 25 is held in place with retainer 26 and retainer clip 27.

The female member 40 comprises a handle end 42, a body section 43, and a receiving chamber 41 dimensioned to match the cylindrical outer wall 28 of the male member and for slideably receiving the male member therein. The female member further comprises a longitudinal bore 44 for slideably receiving a poppet valve 50. The poppet valve 50 of the female member comprises a first cylindrical hollow body section 51, a second hollow body section 52 having apertures 53 extending therethrough, and a conical valve face 54 which seals against valve seat 55 at one end of the female member bore 44. Extending from the conical valve face 54 is nose section 56 which terminates at tip 57. The female member poppet valve is biased into the closed position with a poppet valve spring 45. One end of the poppet valve spring 45 is anchored by retainer 46 and retainer clip 47.

The receiving chamber of the female member includes a pair of annular elastomeric seals for sealing against the outer wall 28 of the male member during interconnection of the coupling members. Preferably, a first outer seal 71 is included in outer groove 70 of the receiving chamber, and an inner seal 73 is included within an inner groove 72 of the receiving chamber. As the male member is inserted into the female member receiving chamber, the leading face 23 of the male member first passes the outer seal, and then passes the inner seal when the members are fully connected.

As can be seen in FIG. 4, the tips 37 and 57 of the male member poppet valve 30 and the female poppet valve 50, respectively, are mutually engaged before the male member is fully inserted into the female member. Typically, the tips are mutually engaged after the leading face 23 of the male member passes the outer seal 71. It also should be noted that the poppet valve of one of the members opens before the poppet valve of the other member, because of a differential between the force constant of the male member poppet valve spring 25 and the female member poppet valve spring 45. One of the poppet valve springs has a stronger force constant than the other poppet valve spring, so that upon initial engagement of the nose section tips 37 and 57, one of the poppet valves slides into the open position before the other poppet valve.

The differential between the force constant of the poppet valve springs of each member is critical to the present invention. It is not critical, however, whether the male member or the female member has the stronger spring. In the embodiment shown in FIG. 4, the stronger spring is shown in the female member, which is in the closed position. The poppet valve spring of the male member is the weaker of the two so the male member poppet valve is open. Thus, in FIG. 4 the male member is connected to the hydraulic line designated for flushing. The flushing operation will be described in more detail below.

The female receiving chamber includes one or more flushing ports 60 and 60A which extend between the receiving chamber 41 and the outer body 43 of the female member. Preferably the flushing ports are positioned between the inner seal 73 and the outer seal 71 of the receiving chamber. The flushing ports further comprise an o-ring seat 61 and an o-ring 62 which surround the circumference of the female member body.

During the flushing operation, the male member is withdrawn partially from the female member receiving chamber so that the leading face 23 of the male member passes the flushing ports 60, 60A. At that time the male member outer wall 28 remains sealed against the outer seal 71 of the receiving chamber. Also during partial withdrawal the tips 37 and 57 of the poppet valves remain engaged. In the embodiment shown in FIG. 4, the poppet valve spring 45 of the female member has a stronger force constant so that it forces the female member poppet valve closed, while the poppet valve of the member which is designated for flushing remains open.

In order to flush the hydraulic line connected to the male member while the members remain in sealed relation, the male member is partially withdrawn from the female member until the leading face 23 passes both the inner seal 73 and the flushing ports 60 and 60A. At this point the poppet valve in the female member has closed. Of course the springs could be reversed if the female member were designated for flushing rather than the male member.

As shown in FIG. 4, wherein the male member is connected to the hydraulic line to be flushed, the male poppet valve remains open so that flushing fluid can be introduced through the corresponding hydraulic line. The flushing fluid is biodegradable, so that it is forced out under pressure through the hydraulic line, through the male member, into the receiving chamber, and out the flushing ports 60 and 60A past the o-ring 62.

When flushing is completed, the flow of flushing fluid and pressure is stopped. After flushing is stopped, the o-ring check valve closes against the o-ring seat 61 due to hydraulic pressure of the outside sea water. The o-ring seal thus prevents entrapment of sea water in the receiving chamber adjacent the leading face 23 of the male member. After flushing, the male member then may be fully inserted to reestablish fluid flow between the male and female members, as shown in FIG. 5.

The advantages of the present invention include elimination of the need for additional equipment during flushing of the hydraulic lines connected to one of the members of a subsea hydraulic coupling. According to the present invention, the hydraulic lines connected to one member may be flushed out while the coupling remains intact and sealed. The member not designated for flushing is sealed while the flushing operation takes place.

Another advantage of the present invention is elimination of time lost while the flushing operation progresses. In order to flush a subsea hydraulic line according to the present invention, the members are partially disconnected while remaining in sealed relation to one another. Thus, because flushing will cause only a minimal delay, the hydraulic lines and equipment can be better maintained without being stopped up by bacteria and other contaminants.

Although variations in the embodiment of the present invention may not each realize all of the advantages of the invention, certain features may become more important than others in various applications of the device. The invention, accordingly, should be understood to be limited only by the scope of the appended claims.

What is claimed is:

1. A self-flushing hydraulic coupling comprising:
a pair of interconnectable male and female members, each of said members connected to a hydraulic line, each of said members having a body, a bore extending through said body, and valve means movable between a seated and an unseated position in said bore to control fluid flow between said members, said female member having a sealed receiving chamber for slidably receiving said male member; the receiving chamber having an outer annular seal and an inner annular seal;
a flushing port in the wall of the receiving chamber for flushing the hydraulic line connected to one of said members while said male member has slidably withdrawn from the inner annular seal in said receiving chamber, said flushing port communicating between said receiving chamber and the outer surface of said female member body.

2. The self-flushing hydraulic coupling of claim 1 wherein each of said valve means comprises a poppet valve and bias means urging said poppet valve towards the seated position; each of the bias means urging the corresponding poppet valves into the closed position at a different point during withdrawal of the male member from the receiving chamber.

3. The self-flushing hydraulic coupling of claim 1 wherein said valve means comprises a poppet valve having a nose section and a valve seat, and wherein upon insertion of the male member into the receiving chamber, said nose sections are mutually engageable to force each of the poppet valves to the unseated position.

4. The self-flushing hydraulic coupling of claim 3 wherein each of said valve means further comprises a spring to urge each of said valve means into the seated position, each of said springs having a different force constant, and wherein one of the springs forces the corresponding valve means t seated position upon partial withdrawal of the male member from the receiving chamber.

5. The self-flushing hydraulic coupling of claim 1 wherein said flushing port further comprises a one-way check valve for allowing fluid to flush outwardly from the receiving chamber through the flushing port and preventing fluid from entering the receiving chamber through the flushing port.

6. The self-flushing hydraulic coupling of claim 5 wherein said one-way check valve is an o-ring in a groove at the outer circumference of the female member.

7. A self-flushing coupling comprising:
(a) a pair of interconnectable female and male members each having a body and longitudinal bore extending therethrough, each of said members connected to a hydraulic line, one of said members designated for flushing;
(b) a poppet valve slidably received within each of said bores and controlling fluid flow therethrough, said poppet valves slidable from a closed position to an open position upon interconnection of said members;
(c) said female member having a sealed central receiving chamber adjacent the bore of said female member for slidably receiving the male member, the receiving chamber having first and second seals; and a flushing port intermediate the first and second seals connecting said sealed receiving chamber to the outer surface of said female member;
(d) said flushing port opening responsive to flushing fluid entering said receiving chamber from the hydraulic line connected to the member designated for flushing upon slidable withdrawal of the male member form the second seal in the receiving chamber; and
(e) wherein during flushing the poppet valve of said member designated for flushing is the open position and the poppet valve of the member not designated for flushing is in the closed position.

8. The self-flushing coupling of claim 7 wherein each of said poppet valves comprises a hollow valve body, a conical valve face, a nose section extending from the apex of said valve face, said nose sections being mutually engageable upon interconnection of the members, and a spring to urge said valve face against a valve seat at one end of said bore, and wherein the spring of said member designated for flushing has a lower force constant than the spring of said member not designated for flushing.

9. The self-flushing coupling of claim 7 wherein said flushing port further comprises a check valve.

10. The self-flushing coupling of claim 9 wherein said check valve comprises a circumferential groove around said female member body, said groove located at the outer end of said flushing port, and a ring fitting within said groove for sealing said flushing port.

11. A method of remotely flushing a hydraulic line connected to either the first or second member of a hydraulic coupling, the second member having outer and inner seals, comprising the steps of:

(a) remotely actuating the first member to slidably withdraw the first member from the inner seal of the second member to define a sealed cavity therebetween;

(b) introducing flushing fluid from the hydraulic line through the first member and into the sealed cavity while simultaneously closing off fluid flow to the second member;

(c) opening a flushing port communicating between the cavity and exterior surface of the coupling.

* * * * *